United States Patent
Lee et al.

(10) Patent No.: US 10,629,965 B2
(45) Date of Patent: Apr. 21, 2020

(54) BATTERY MODULE, BATTERY PACK INCLUDING SUCH BATTERY MODULE, AND VEHICLE INCLUDING SUCH BATTERY PACK

(71) Applicant: LG CHEM, LTD., Seoul (KR)

(72) Inventors: Young-Ho Lee, Daejeon (KR); Jun-Kyu Park, Daejeon (KR); Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 234 days.

(21) Appl. No.: 15/572,584

(22) PCT Filed: Sep. 20, 2016

(86) PCT No.: PCT/KR2016/010479
§ 371 (c)(1),
(2) Date: Nov. 8, 2017

(87) PCT Pub. No.: WO2017/078265
PCT Pub. Date: May 11, 2017

(65) Prior Publication Data
US 2018/0159186 A1    Jun. 7, 2018

(30) Foreign Application Priority Data
Nov. 5, 2015 (KR) .................. 10-2015-0155195

(51) Int. Cl.
*H01M 10/48* (2006.01)
*H01M 2/20* (2006.01)
*H01M 2/10* (2006.01)

(52) U.S. Cl.
CPC ....... *H01M 10/486* (2013.01); *H01M 2/1077* (2013.01); *H01M 2/206* (2013.01); *H01M 10/482* (2013.01); *H01M 2220/20* (2013.01)

(58) Field of Classification Search
None
See application file for complete search history.

(56) References Cited

U.S. PATENT DOCUMENTS

| 6,455,190 B1 | 9/2002 | Inoue et al. |
| 9,508,814 B2 | 11/2016 | Nishida et al. |

(Continued)

FOREIGN PATENT DOCUMENTS

| CN | 101383439 A | 3/2009 |
| CN | 102483359 A | 5/2012 |

(Continued)

OTHER PUBLICATIONS

International Search Report for PCT/KR2016/010479 dated Dec. 27, 2016.

*Primary Examiner* — Alix E Eggerding
(74) *Attorney, Agent, or Firm* — Birch, Stewart, Kolasch & Birch, LLP

(57) ABSTRACT

Disclosed is a battery module, which includes a battery cell assembly having a plurality of battery cells which are stacked one another, an interconnection board mounted to at least one side of the battery cell assembly to electrically connect the plurality of battery cells, a temperature sensor mounting groove provided at the interconnection board so that a temperature sensor for measuring a temperature of the battery cell assembly passes therethrough, and an assembling error preventer provided at a bottom of the temperature sensor mounting groove to prevent the temperature sensor from interfacing with a facing battery cell which faces the temperature sensor when the temperature sensor passes through the temperature sensor mounting groove.

17 Claims, 8 Drawing Sheets

(56) References Cited

U.S. PATENT DOCUMENTS

| | | | |
|---|---|---|---|
| 9,786,962 | B2 | 10/2017 | Ahn et al. |
| 2009/0286143 | A1 | 11/2009 | Matthias et al. |
| 2010/0136392 | A1* | 6/2010 | Pulliam .................. G01K 1/026 429/90 |
| 2010/0285340 | A1 | 11/2010 | Matsunaga |
| 2011/0104533 | A1* | 5/2011 | Seto ........................ B60L 50/64 429/90 |
| 2012/0031517 | A1 | 2/2012 | Yoshida et al. |
| 2012/0040222 | A1* | 2/2012 | Quick ................. H01M 10/647 429/120 |
| 2012/0315508 | A1 | 12/2012 | Kurita |
| 2014/0322568 | A1 | 10/2014 | Sakai et al. |

FOREIGN PATENT DOCUMENTS

| | | |
|---|---|---|
| CN | 202372264 U | 6/2012 |
| CN | 102820440 A | 12/2012 |
| JP | 2011-60675 A | 3/2011 |
| JP | 2016-72181 A | 5/2016 |
| KR | 10-2014-0083985 A | 7/2014 |
| KR | 10-2015-0065280 A | 6/2015 |
| WO | WO 2013/084942 A1 | 6/2013 |
| WO | WO 2014/126339 A1 | 8/2014 |

\* cited by examiner

BATTERY MODULE, BATTERY PACK INCLUDING SUCH BATTERY MODULE, AND VEHICLE INCLUDING SUCH BATTERY PACK

TECHNICAL FIELD

The present disclosure relates to a battery module, a battery pack including the battery module, and a vehicle including the battery pack.

The present application claims priority to Korean Patent Application No. 10-2015-0155195 filed on Nov. 5, 2015 in the Republic of Korea, the disclosures of which are incorporated herein by reference.

BACKGROUND ART

A secondary battery, which is easily applied to various product groups and has electrical characteristics such as high energy density, is universally applied not only for a portable device but also for an electric vehicle (EV) or a hybrid electric vehicles (HEV), an energy storage system or the like, which is driven by an electric driving source. The secondary battery is attracting attention as a new environment-friendly energy source for improving energy efficiency since it gives a primary advantage of reducing the use of fossil fuels and also does not generate by-products by the use of energy at all.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of a plurality of battery cells first, and then configure a battery pack by using a plurality of battery modules and adding other components.

In a battery module or a battery pack which includes a plurality of battery cells for high output and large capacity, ignition or explosion may occur due to heat generated during a charging/discharging process. Thus, a temperature sensor is generally mounted to the battery module in order to monitor the temperature of battery cells inside the battery module. The temperature sensor is inserted through the battery module and mounted at the inside of the battery module so as to be located near the battery cells inside the battery module for accurate temperature measurement.

Hereinafter, an assembly process for mounting a temperature sensor at a conventional battery module will be described in more detail with reference to FIG. 1.

FIG. 1 is a diagram for illustrating an assembly error of the temperature sensor of the conventional battery module.

Referring to FIG. 1, the conventional battery module 1 includes a battery cell assembly 2 having a plurality of battery cells 3, an interconnection board 5 mounted to an upper side of the battery cell assembly 2 to electrically connect the plurality of battery cells 3, a temperature sensor mounting groove 6 provided at the interconnection board, and a temperature sensor 7 inserted through the temperature sensor mounting groove 6 to measure the temperature of the battery cells 3 in the battery module 1.

However, in the conventional battery module 1, when the temperature sensor 7 is mounted, if an end 4 of the battery cell 3 is disposed at a bottom of the temperature sensor mounting groove 6, an end 8 of the temperature sensor 7 may frequently interfere with the end 4 of the battery cell 3. If the interference occurs, the temperature sensor 7 may not be easily mounted inside the battery module 1.

Also, when the interference occurs, if the temperature sensor 7 is continuously assembled for mounting the temperature sensor 7, for example by forcibly pushing the temperature sensor 7, the temperature sensor 7 may cause an assembling error or damage the battery cell 3.

DISCLOSURE

Technical Problem

The present disclosure is designed to solve the problems of the related art, and therefore the present disclosure is directed to providing a battery module which may prevent an assembling error of a temperature sensor when the temperature sensor is mounted to the battery module, a battery pack including the battery module, and a vehicle including the battery pack.

Technical Solution

In one aspect of the present disclosure, there is provided a battery module, comprising: a battery cell assembly having a plurality of battery cells which are stacked one another; an interconnection board mounted to at least one side of the battery cell assembly to electrically connect the plurality of battery cells; a temperature sensor mounting groove provided at the interconnection board so that a temperature sensor for measuring a temperature of the battery cell assembly passes therethrough; and an assembling error preventer provided at a bottom of the temperature sensor mounting groove to prevent the temperature sensor from interfacing with a facing battery cell which faces the temperature sensor when the temperature sensor passes through the temperature sensor mounting groove.

The assembling error preventer may include: a preventer body configured to protrude from the bottom of the interconnection board toward the plurality of battery cells and having a sensor passing hole communicating with the temperature sensor mounting groove so that the temperature sensor passes therethrough; and a sensor assembling guider provided at the preventer body to push a facing battery cell, which faces the sensor assembling guider when the interconnection board is mounted, to the outside of the sensor passing hole.

The sensor assembling guider may be inclined toward the facing battery cell.

When the interconnection board is mounted, the facing battery cell which faces the sensor assembling guider may slide above the sensor assembling guider in contact with the sensor assembling guider.

The sensor assembling guider may be formed at an outer surface of the preventer body.

An outer diameter of the preventer body may be gradually decreased toward the battery cell assembly.

The assembling error preventer may be integrally formed with the interconnection board.

In another aspect of the present disclosure, there is provided a battery pack, comprising at least one battery module according to the above embodiments; and a pack case configured to package the at least one battery module.

In another aspect of the present disclosure, there is provided a vehicle, comprising the battery pack according to the above embodiment.

Advantageous Effects

According to various embodiments as described above, it is possible to provide a battery module which may prevent an assembling error of a temperature sensor when the temperature sensor is mounted to the battery module, a battery pack including the battery module, and a vehicle including the battery pack.

Accordingly, it is possible to provide a battery module which may prevent battery cells from being damaged due to interference when the temperature sensor is mounted, a battery pack including the battery module, and a vehicle including the battery pack.

Moreover, it is possible to provide a battery module which may ensure improved assembling and productivity by mounting the temperature sensor, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
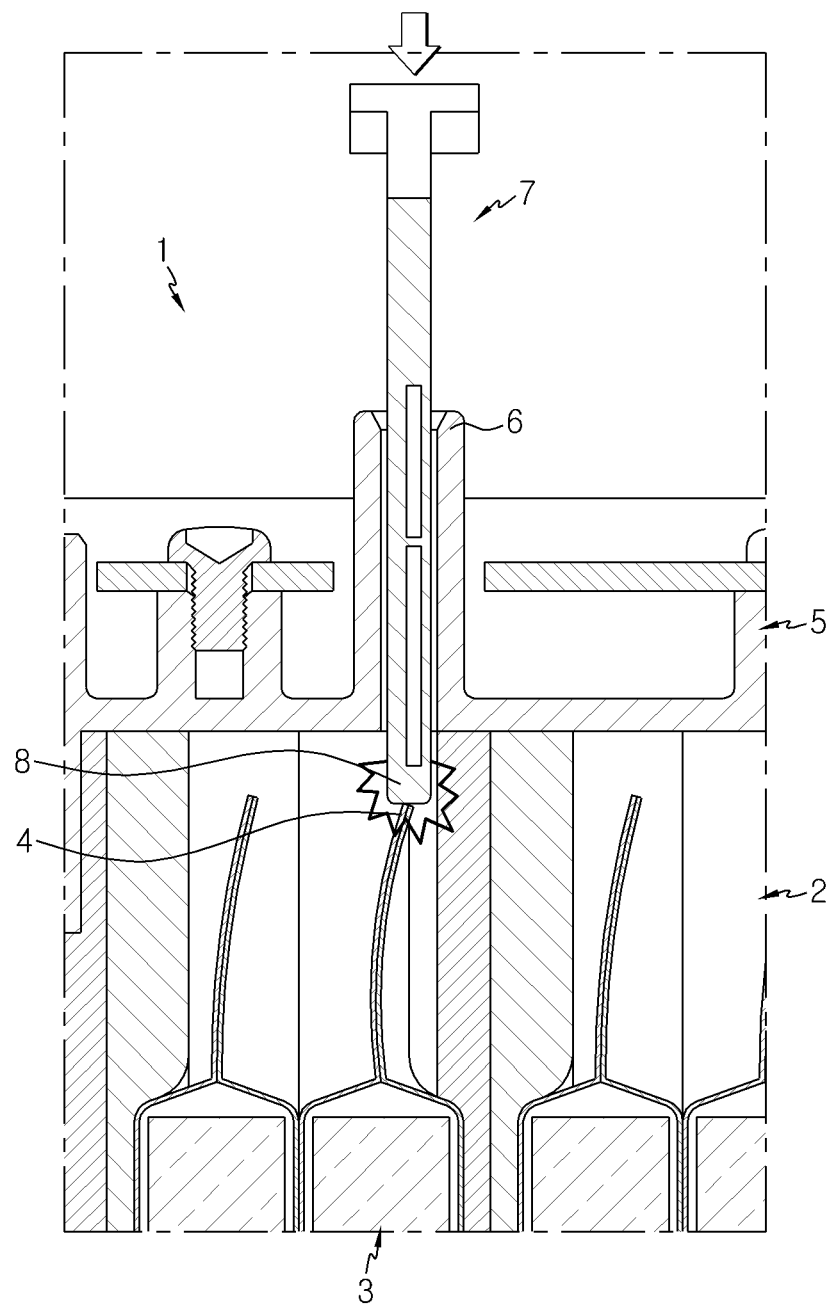
FIG. 1 is a diagram for illustrating an assembly error of a temperature sensor of a conventional battery module.
Figure 2:
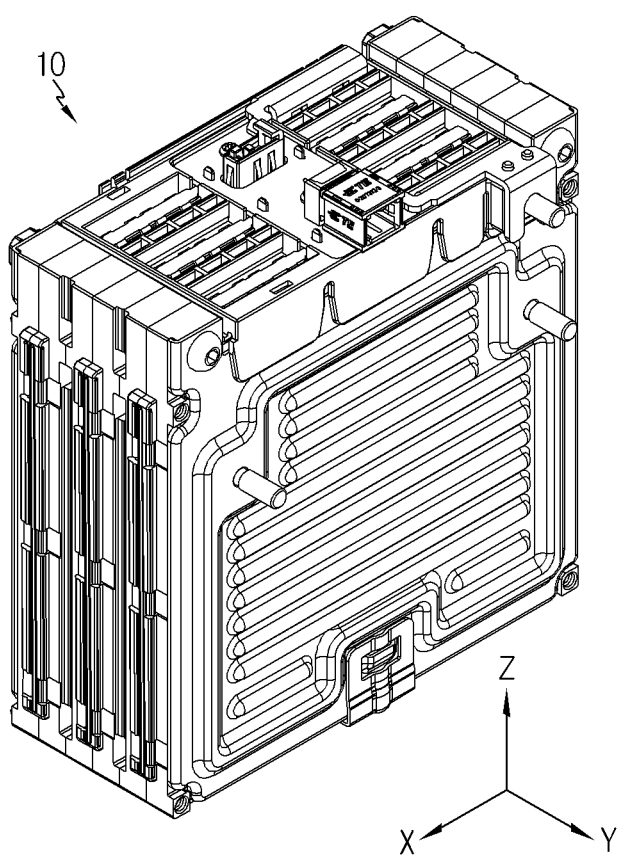
FIG. 2 is a diagram for illustrating a battery module according to an embodiment of the present disclosure.
Figure 3:
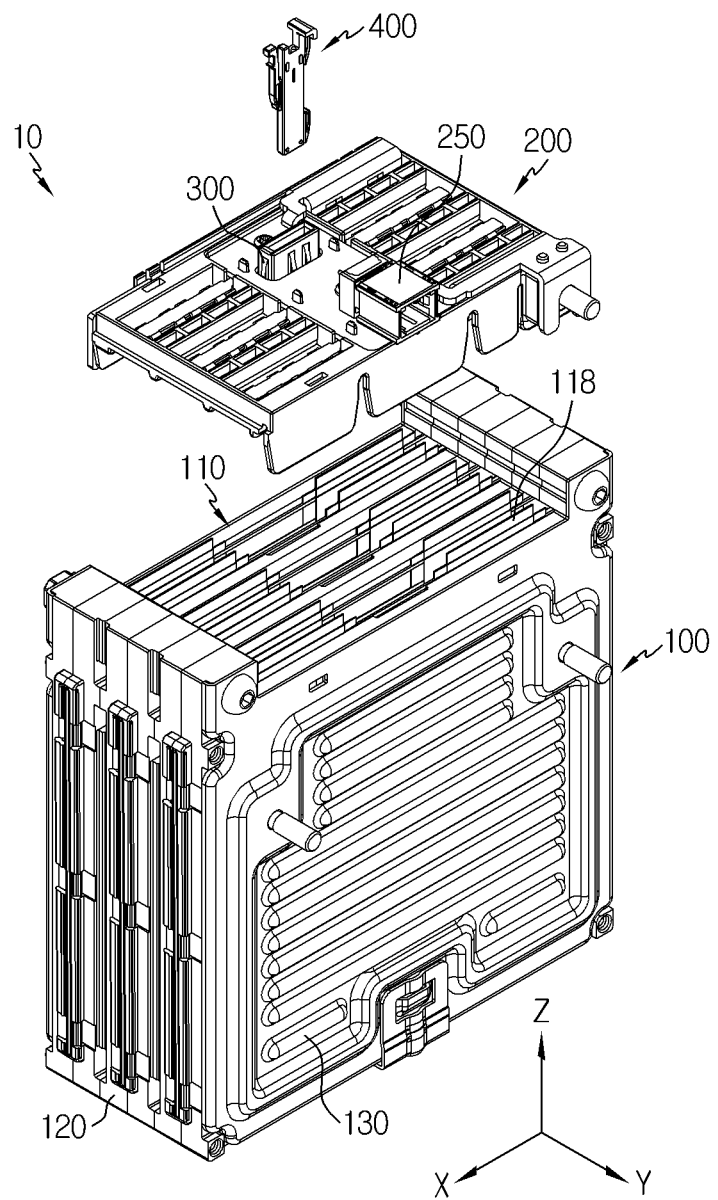
FIG. 3 is an exploded perspective view showing the battery module of FIG. 2.
Figure 4:
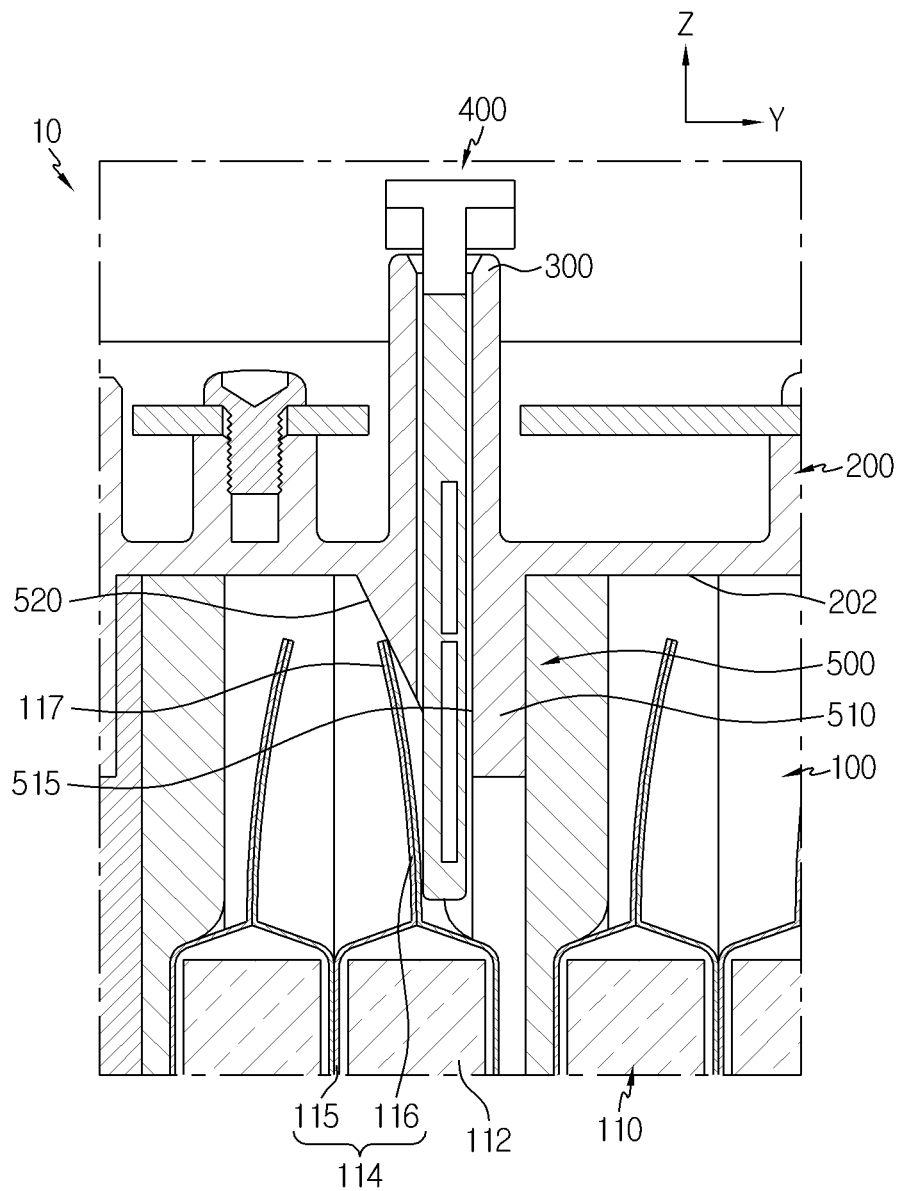
FIG. 4 is a cross-sectioned view showing the battery module of FIG. 2.

FIG. 2 is a diagram for illustrating a battery module according to an embodiment of the present disclosure, FIG. 3 is an exploded perspective view showing the battery module of FIG. 2, and FIG. 4 is a cross-sectioned view showing the battery module of FIG. 2.

Referring to FIGS. 2 to 4, the battery module 10 may include a battery cell assembly 100, an interconnection board 200, a temperature sensor mounting groove 300, a temperature sensor 400, and an assembling error preventer 500.

The battery cell assembly 100 may be provided as an assembly of various major components of the battery module 10. The battery cell assembly 100 may include a battery cell 110, a cell cartridge 120, and an end plate 130.

The battery cell 110 is a pouch-type secondary battery, and may be provided in plurality. The plurality of battery cells 110 may be stacked in a front and rear direction (in a Y-axis direction) or an upper and lower direction (in a Z-axis direction).

Each of the plurality of battery cells 110 may include an electrode assembly 112, a pouch case 114, and an electrode lead 118.

The electrode assembly 112 may include a positive electrode plate, a negative electrode plate, and a separator. The electrode assembly 112 is well known in the art and thus is not described in detail here.

The pouch case 114 packages the electrode assembly 112 and may be provided as a laminate sheet including a resin layer and a metal layer. The pouch case 114 may include a pouch body 115 and a pouch terrace 116.

The pouch body 115 may accommodate the electrode assembly 112. The pouch terrace 116 may protrude from the pouch body 115 and be thermally fused to seal the inside of the pouch body 115 which accommodates the electrode assembly 112.

The electrode lead 118 is electrically connected to the electrode assembly 112 and may protrude out of the pouch terrace 116 of the pouch case 114. The electrode lead 118 may be provided in a pair. The pair of electrode leads 118 may include a positive electrode lead and a negative electrode lead.

The cell cartridge 120 is configured to hold at least one battery cell 110 to prevent the battery cell 110 from moving and to be stacked one another to guide assembling of the plurality of battery cells 110. The cell cartridge 120 may be provided in plurality and stacked one another to guide stacking of the plurality of battery cells 110.

The end plate 130 supports the plurality of battery cells 110 mounted to the plurality of cell cartridges 120, and the end plate 130 may be provided in a pair and respectively mounted to the cell cartridges 120 provided at outermost portions of the plurality of cell cartridges 120 in the front and rear direction.

The interconnection board 200 may be mounted to at least one side of the battery cell assembly 100, specifically to an upper side of the battery cell assembly 100 and electrically connect the plurality of battery cells 110 of the battery cell assembly 100.

The interconnection board 200 may include a connector mounting part 250.

The connector mounting part 250 is provided at an upper side of the interconnection board 200 and may be coupled to a terminal of a connector or the like for electrically connecting to an external control device or the like of the battery module 10.

The temperature sensor mounting groove 300 may be provided at the interconnection board 200. A temperature sensor 400, explained later, may be inserted through the temperature sensor mounting groove 300 to measure a temperature of the battery cell assembly 100, specifically a temperature of the plurality of battery cells 110.

The temperature sensor 400 is used for measuring the temperature of the plurality of battery cells 110 as described above, and may be inserted through the temperature sensor mounting groove 300 and disposed near the battery cells 110.

The temperature sensor 400 may be a thermistor. The temperature sensor 400 may also be selected from various other temperature sensors capable of measuring the temperature of the battery cells 110, without being limited thereto.

The assembling error preventer 500 is used for preventing an assembling error of the temperature sensor 400 and may prevent the temperature sensor 400 from interfering with a battery cell 110, which faces the temperature sensor 400, when the temperature sensor 400 passes through the temperature sensor mounting groove 300.

The assembling error preventer 500 may protrude downwards (in a −Z-axis direction) from a bottom 202 of the interconnection board 200 and be provided at a bottom of the temperature sensor mounting groove 300 to communicate with the temperature sensor mounting groove 300. Here, the assembling error preventer 500 may be integrally formed with the interconnection board 200.

In detail, the assembling error preventer 500 may include a preventer body 510 and a sensor assembling guider 520.

The preventer body 510 may protrude downwards (in a −Z-axis direction) from the bottom 202 of the interconnection board 200 toward the plurality of battery cells 110. Here, the preventer body 510 may be integrally extended from the interconnection board 200.

The preventer body 510 may have a sensor passing hole 515.

The sensor passing hole 515 may communicate with the temperature sensor mounting groove 300 so that the temperature sensor 400 passes therethrough. In detail, the sensor passing hole 515 may form a through passage which allows the temperature sensor 400 to pass, together with the temperature sensor mounting groove 300.

The sensor assembling guider 520 is provided at the preventer body 510 and may push an end 117 of the pouch terrace 116 of the battery cell 110, which faces the sensor assembling guider 520 when the interconnection board 200 is mounted to the battery cell assembly 100, to the outside of the sensor passing hole 515.

The sensor assembling guider 520 may be formed at outer surface of the preventer body 510 to inclined downwards (in a −Z-axis direction) toward the facing battery cell 110. In other words, the sensor assembling guider 520 may be formed to have a substantially oblique cross-section. Accordingly, the outer diameter of the preventer body 510 may be gradually decreased toward the battery cell assembly 100.

Hereinafter, a specific process for assembling the temperature sensor 400 of the battery module 10 according to this embodiment will be described in detail.

Figure 5:
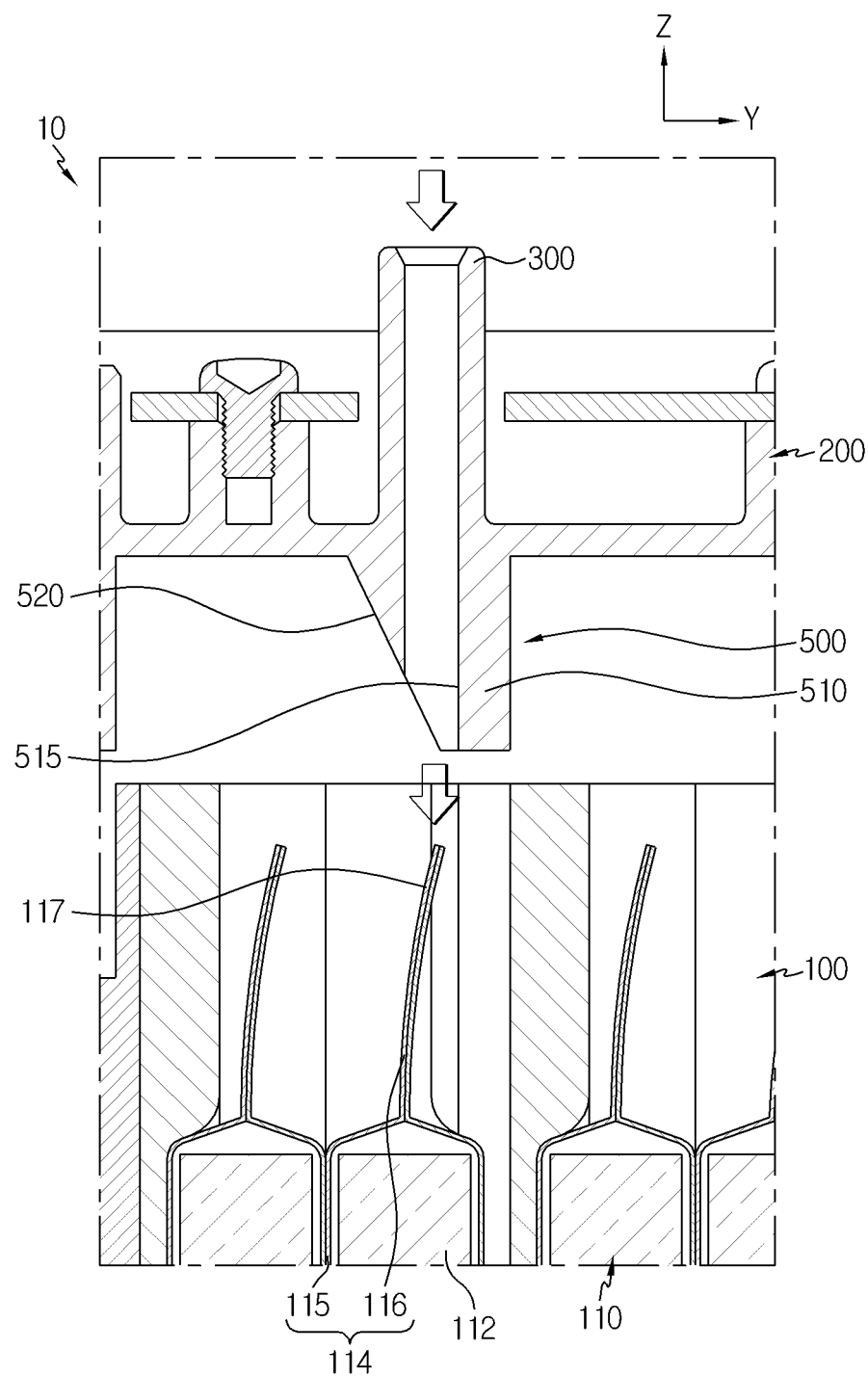
FIGS. 5 to 7 are diagrams for illustrating a process of assembling a temperature sensor to the battery module of FIG. 2.
Figure 6:
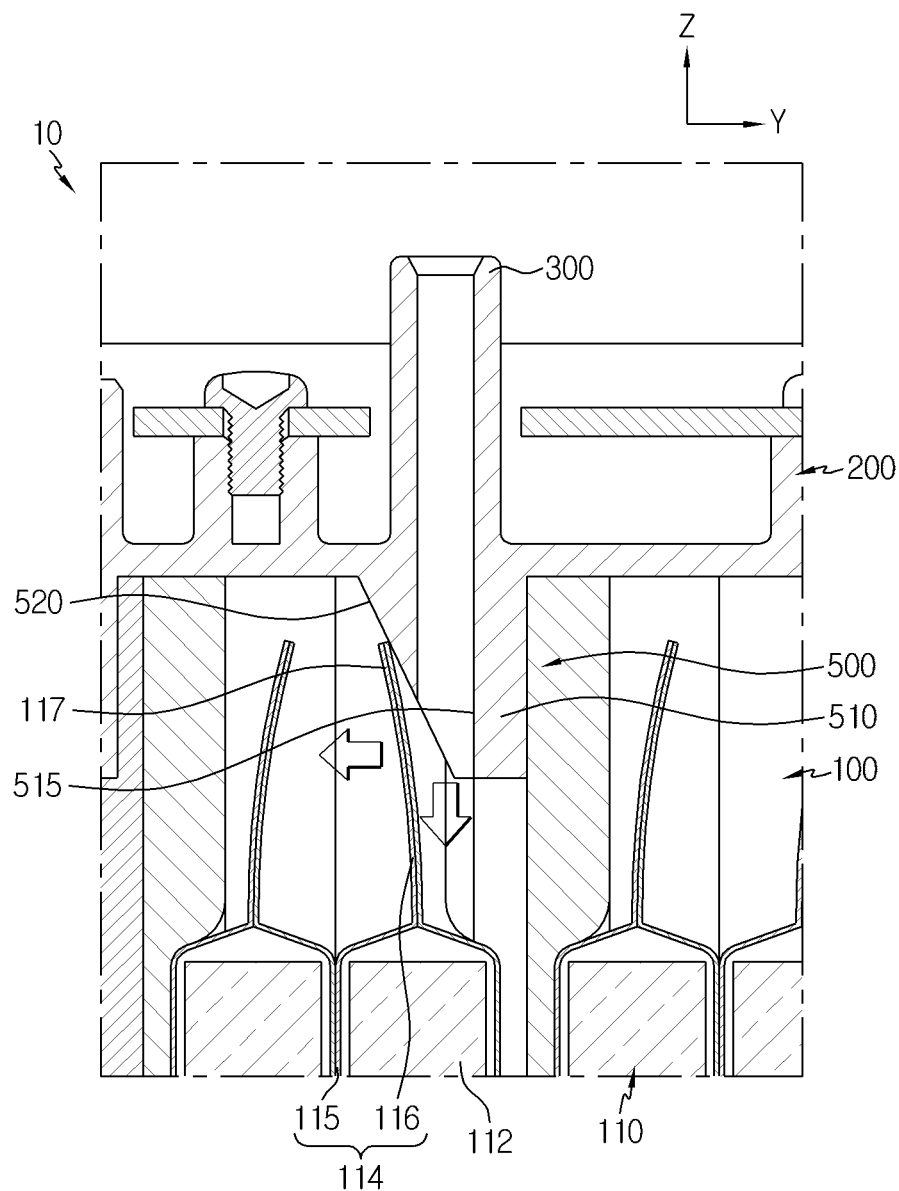
Figure 7:
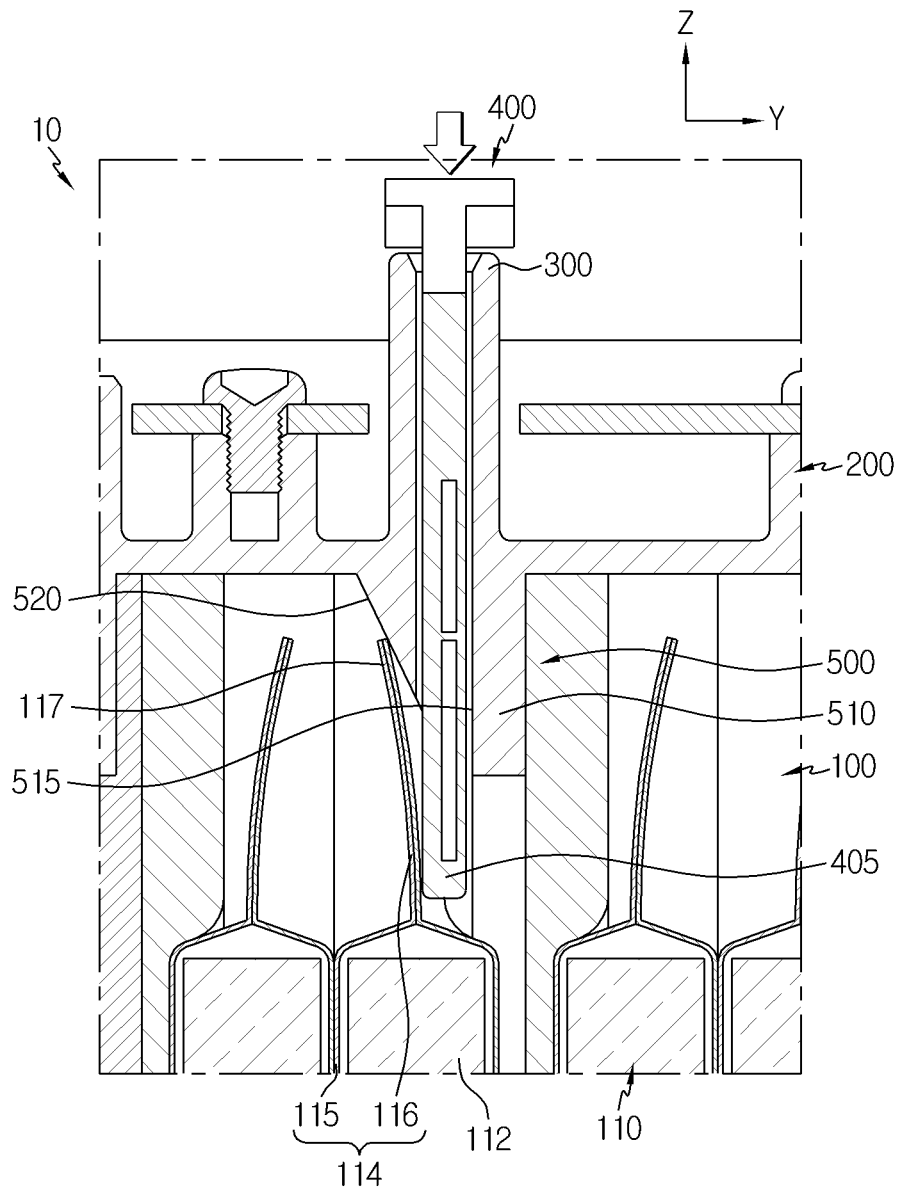

FIGS. 5 to 7 are diagrams for illustrating a process of assembling a temperature sensor to the battery module of FIG. 2.

Referring to FIGS. 5 to 7, first, a manufacturer or the like may mount the interconnection board 200 to the battery cell assembly 100 to cover the upper side of the battery cell assembly 100. The interconnection board 200 may be moved downwards (in a −Z-axis direction) from the upper side of the battery cell assembly 100 and then mounted to the upper side of the battery cell assembly 100 by using a coupling member or the like.

At this time, the battery cell 110 disposed at the bottom of the temperature sensor mounting groove 300 may be disposed to face the sensor assembling guider 520 of the assembling error preventer 500. Here, as the interconnection board 200 moves downwards (in a −Z-axis direction), the end 117 of the pouch terrace 116 of the battery cell 110 facing the sensor assembling guider 520 may slide above the sensor assembling guider 520 along the slope of the sensor assembling guider 520 in contact with the sensor assembling guider 520.

Accordingly, the end 117 of the pouch terrace 116 of the battery cell 110 facing the sensor assembling guider 520 may be pushed out of the sensor passing hole 515 to any one of both sides out of the sensor passing hole 515, in this embodiment to a left side out of the sensor passing hole 515. Thus, the end 117 of the pouch terrace 116 may be located outside the bottom of the temperature sensor mounting groove 300.

If the interconnection board 200 is completely mounted, the manufacturer or the like may move the temperature sensor 400 to a lower direction (in a −Z-axis direction) through the temperature sensor mounting groove 300 and the sensor passing hole 515 of the assembling error preventer 500.

At this time, in the battery cell 110 disposed at the bottom of the temperature sensor mounting groove 300, the end 117 of the pouch terrace 116 is disposed at a point out of the temperature sensor mounting groove 300 and the sensor passing hole 515. Thus when the temperature sensor 400 is inserted through the temperature sensor mounting groove 300 and the sensor passing hole 515, the end 117 of the pouch terrace 116 does not interfere with the end 405 of the temperature sensor 400.

Accordingly, the temperature sensor 400 may be mounted to be stably positioned near the battery cell 110 without interfering with the end 117 of the facing battery cell 110, namely the end 117 of the pouch terrace 116, by means of the assembling error preventer 500.

As described above, the battery module 10 according to this embodiment may prevent an assembling error of the temperature sensor 400 by means of the assembling error preventer 500, thereby preventing the battery cell 110 from being damaged when the temperature sensor 400 is mounted.

Moreover, according to the battery module 10 of this embodiment, the assembling and productivity of the battery module 10 may be greatly improved by means of the above mounting structure of the temperature sensor 400.

Figure 8:
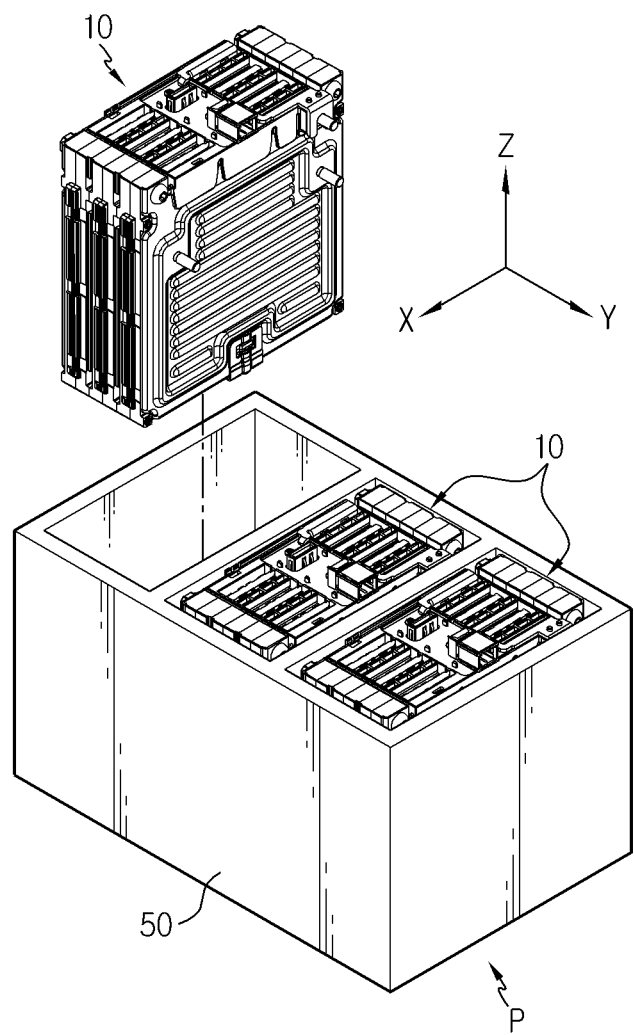
FIG. 8 is a diagram for illustrating a battery pack according to an embodiment of the present disclosure.

FIG. 8 is a diagram for illustrating a battery pack according to an embodiment of the present disclosure.

Referring to FIG. 8, a battery pack P may include at least one battery module 10 and a pack case 50 for packaging the at least one battery module 10.

The battery pack P may be provided to a vehicle as a fuel source of the vehicle. As an example, the battery pack P may be provided to an electric vehicle, a hybrid vehicle, and various other-type vehicles capable of using the battery pack P as a fuel source.

In addition, the battery pack P may be provided in other devices, instruments or facilities such as an energy storage system using a secondary battery, in addition to the vehicle.

As described above, the battery pack P of this embodiment and devices, instruments or facilities such as a vehicle, which have the battery pack P, include the battery module 10 as described above, and thus it is possible to implement a battery pack P having all the advantages of the battery pack 10 described above, or devices, instruments or facilities such as a vehicle, which have the battery pack P.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a battery cell assembly including a plurality of battery cells which are stacked one another;
an interconnection board mounted to at least one side of the battery cell assembly to electrically connect the plurality of battery cells;
a temperature sensor mounting groove provided at the interconnection board so that a temperature sensor for measuring a temperature of the battery cell assembly passes therethrough; and
an assembling error preventer provided at a bottom of the temperature sensor mounting groove to prevent the temperature sensor from interference with a facing battery cell which faces the temperature sensor when the temperature sensor passes through the temperature sensor mounting groove by pushing away an end of a pouch terrace of the facing battery cell until the end of the pouch terrace is rested on a midsection of the assembling error preventer.

2. The battery module according to claim 1, wherein the assembling error preventer includes:
a preventer body configured to protrude from the bottom of the interconnection board toward the plurality of battery cells and having a sensor passing hole communicating with the temperature sensor mounting groove so that the temperature sensor passes therethrough; and
a sensor assembling guider provided at the preventer body to push the facing battery cell, which faces the sensor assembling guider when the interconnection board is mounted, to the outside of the sensor passing hole.

3. The battery module according to claim 2, wherein the sensor assembling guider is inclined toward the facing battery cell.

4. The battery module according to claim 3, wherein when the interconnection board is mounted, the facing battery cell which faces the sensor assembling guider slides above the sensor assembling guider in contact with the sensor assembling guider.

5. The battery module according to claim 3, wherein the sensor assembling guider is formed at an outer surface of the preventer body.

6. The battery module according to claim 5, wherein an outer diameter of the preventer body is gradually decreased toward the battery cell assembly.

7. The battery module according to claim 1, wherein the assembling error preventer is integrally formed with the interconnection board.

8. A battery pack, comprising:
at least one battery module defined in claim 1; and
a pack case configured to package the at least one battery module.

9. A vehicle, comprising a battery pack defined in claim 8.

10. A battery module, comprising:
a battery cell assembly including a plurality of battery cells which are stacked one another;
an interconnection board mounted to at least one side of the battery cell assembly to electrically connect the plurality of battery cells;
a temperature sensor mounting groove provided at the interconnection board so that a temperature sensor for measuring a temperature of the battery cell assembly passes therethrough; and
an assembling error preventer provided at a bottom of the temperature sensor mounting groove to prevent the temperature sensor from interference with a facing battery cell which faces the temperature sensor when the temperature sensor passes through the temperature sensor mounting groove,
wherein the assembling error preventer includes:
a preventer body configured to protrude from the bottom of the interconnection board toward the plurality of battery cells and having a sensor passing hole communicating with the temperature sensor mounting groove so that the temperature sensor passes therethrough; and
a sensor assembling guider provided at the preventer body to push the facing battery cell, which faces the sensor assembling guider when the interconnection board is mounted, to the outside of the sensor passing hole.

11. The battery module according to claim 10, wherein the sensor assembling guider is inclined toward the facing battery cell.

12. The battery module according to claim 11, wherein when the interconnection board is mounted, the facing battery cell which faces the sensor assembling guider slides above the sensor assembling guider in contact with the sensor assembling guider.

13. The battery module according to claim 11, wherein the sensor assembling guider is formed at an outer surface of the preventer body.

14. The battery module according to claim 13, wherein an outer diameter of the preventer body is gradually decreased toward the battery cell assembly.

15. The battery module according to claim 10, wherein the assembling error preventer is integrally formed with the interconnection board.

16. A battery pack, comprising:
at least one battery module defined in claim 10; and
a pack case configured to package the at least one battery module.

17. A vehicle, comprising a battery pack defined in claim 16.

* * * * *